G. C. AMUNDSON.
RAIL FASTENER.
APPLICATION FILED MAR. 15, 1915.
1,150,323.
Patented Aug. 17, 1915.
2 SHEETS—SHEET 1.
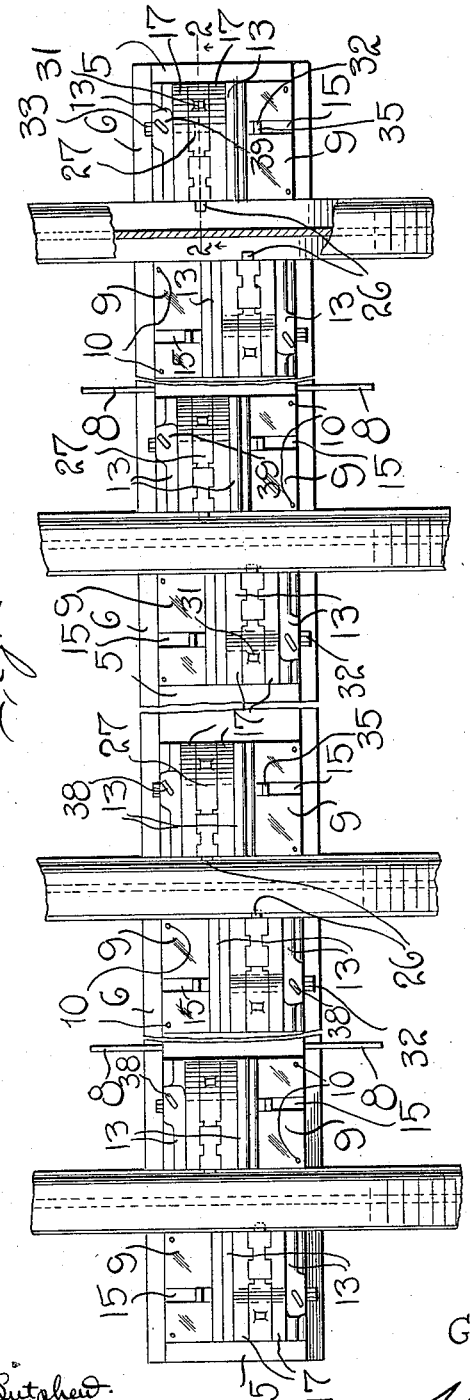
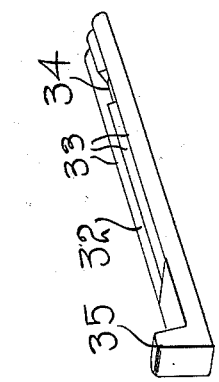
Inventor
GEORGE C. AMUNDSON G. C. AMUNDSON.
RAIL FASTENER.
APPLICATION FILED MAR. 15, 1915.
1,150,323.
Patented Aug. 17, 1915.
2 SHEETS—SHEET 2.
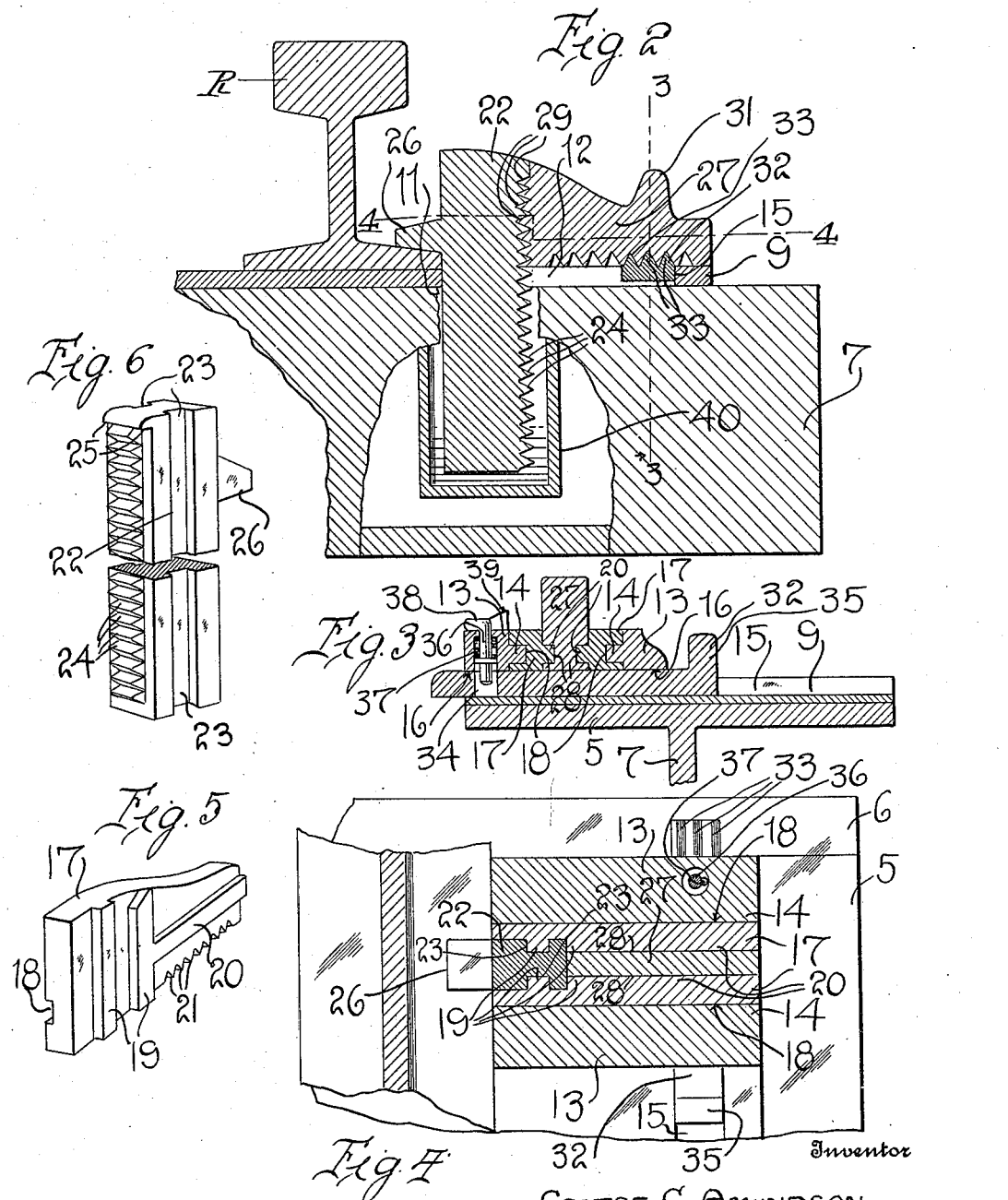
Witnesses
Robert M. Sutphen
A. J. Hurd
Inventor
GEORGE C. AMUNDSON
By Watson E. Coleman
Attorney

UNITED STATES PATENT OFFICE.

GEORGE C. AMUNDSON, OF GRAYLING, MINNESOTA.

RAIL-FASTENER.

1,150,323.  Specification of Letters Patent.  Patented Aug. 17, 1915.

Application filed March 15, 1915. Serial No. 14,438.

*To all whom it may concern:*

Be it known that I, GEORGE C. AMUNDSON, a citizen of the United States, residing at Grayling, in the county of Aitkin and State of Minnesota, have invented certain new and useful Improvements in Rail-Fasteners, of which the following is a specification, reference being had to the accompanying drawings.

This invention relates to rail fasteners and has for its primary object to provide adjustable fastening means whereby various sizes of rails may be securely clamped upon the tie.

The invention has for an additional object to provide a longitudinally and vertically adjustable rail clamping member, and means for securely locking said clamping member in its adjusted position.

It is an additional object of the invention to provide a rail fastening or clamping device which may be easily and quickly adjusted to secure the rail upon the tie in a raised or elevated position, and compensate for expansion or contraction of the rail, said device, as a whole, being extremely durable in its construction and applicable to various forms of metal rail ties.

With the above and other objects in view, my invention consists in the novel features of construction, combination, and arrangement of parts to be hereinafter more fully described, claimed, and illustrated in the accompanying drawings, in which, Figure 1 is a top plan view of a rail tie showing four rails supported thereon and fastened or secured by means of my improved fastening device; Fig. 2 is an enlarged longitudinal section taken on the line 2—2 of Fig. 1; Fig. 3 is a section taken on the line 3—3 of Fig. 2; Fig. 4 is a horizontal section taken on the line 4—4 of Fig. 2; Fig. 5 is an inner face view of one of the guide lugs for the fastening and locking members; Fig. 6 is a detail perspective view of the fastening member; Fig. 7 is a similar view of the locking member; and Fig. 8 is a perspective view of the key.

Referring in detail to the drawings, 5 and 6 designate the upper and lower plates respectively, of the metal rail tie. The lower or base plate 6 of the tie is of somewhat greater width than the upper plate 5, and said plates are centrally connected together by an integral longitudinally extending web 7. Centrally of the tie, laterally extending anchoring webs 8 are integrally formed with the vertical web in the upper and lower plates 5 and 6. These anchoring webs 8 project outwardly beyond the longitudinal edges of the tie and into the ballast bed, whereby longitudinal shifting movement of the tie is effectually prevented.

Upon the top plate 5, on each side of its center, a chair plate 9 is secured by bolts indicated at 10. Each of these chair plates carries two of my improved fastening devices, whereby the respective rails of a track may be securely fastened or clamped upon the chair plate. At one side of the longitudinal center of the tie, the top plate 5 is formed with a longitudinally extending elongated opening 11 with which a similar opening 12 in the chair plate 9 coincides. Two such openings are provided in each of the chair plates and they are disposed out of alinement with each other longitudinally of the plate. Upon the chair plate, in spaced relation to the longitudinal edges of the opening 12, the longitudinally extending lugs or flanges 13 are formed or suitably secured. The inner face of each of the flanges 13 has a longitudinally extending rib 14 formed thereon. The surface of the tie plate has a transversely extending groove or channel 15 cut therein which intersects the outer end of the opening 12. This groove extends under the flanges 13, and said flanges above the groove are notched or recessed as at 16.

Guide members 17 are arranged between the flanges 13. Each of these guide members includes an elongated body plate gradually tapering from one of its ends to the other, and in the outer face of said plate, a longitudinally extending groove or channel 18 is formed. These channels in the guide members are adapted to receive the ribs 14 on the inner faces of the respective flanges 13. Upon the inner face of each of the guide members 17 and adjacent to its wider end, the spaced vertical ribs 19 are formed, and a longitudinal rib 20 extends from the inner vertical rib 19 to the opposite end of the guide member. The lower longitudinal edge of each of the guide members is provided with a plurality of V-shaped teeth 21.

The fastening member 22 consists of a heavy metal bar having the longitudinally extending grooves or channels 23 formed in its side faces, said bar being provided upon one of its longitudinal edges with teeth 24 and upon its upper end, at opposite sides of these teeth, with stop lugs 25. The upper ends of the inner ribs 19 on the guide members are preferably beveled or inclined, as shown, for engagement by the stop lugs 25. Upon the other longitudinal edge of the fastening member and adjacent to its upper end, the rail clamping lug 26 is integrally formed. In arranging this fastening member in its operative position, the outermost vertically disposed ribs 19 on the guide members are adapted to be received in the grooves 23 formed in the opposite faces of the fastening member.

A locking member 27 is provided for the purpose of locking the fastening member 22 against vertical movement. This member includes a body plate of slightly tapering form in the opposite faces of which the longitudinally extending grooves 28 are provided. Upon the wider end of said locking member, a series of teeth 29 are formed for interlocking engagement with the teeth 24 on the edge of the fastening member 22. The bottom face of this locking member is also provided with a series of transversely extending teeth 30, the purpose of which will be later explained. A lug 31 is formed upon the upper edge of said locking member whereby the same may be readily manipulated. It will be understood that the longitudinal ribs 19 on the guide members 17 are adapted to be received in the grooves 28 of the member 27.

It will be observed that the inner end of the opening 12 in the chair plate extends beyond the corresponding end of the flanges 13 so that the guide members 17 may be moved longitudinally upon the chair plate and the vertically disposed fastening member 22 adjusted in accordance with the width of the rail. Assuming that the rail has been arranged in position, as shown in Fig. 1, the fastening member is arranged between the inner ends of the guide members 17 as above explained, and said members are shifted longitudinally upon the longitudinal ribs 14 on the inner faces of the flanges 13 until the clamping lug 26 is engaged upon the base of the rail, indicated at R. The locking member 27 is now inserted between the guides, and the teeth 29 on the end thereof are engaged with the teeth 24 on the outer edge of the vertically disposed fastening bar, whereby said bar is securely held against vertical movement between the guides.

In order to lock the member 27 against outward longitudinal movement between the guides 17, I provide a key 32 which is in the form of a long longitudinal bar and is adapted for sliding engagement in the transverse groove or channel 15 formed in the upper surface of the chair plate. This key bar is provided with a number of longitudinally extending ribs or teeth 33, and adjacent one end of said bar, an opening 34 is formed therein. The other end of the key bar is provided with a suitable finger piece 35. After the fastening bar and the locking member therefor have been assembled, the key 32 is inserted into the channel 15 and through the recesses 16 in the vertical flanges 13. The longitudinal teeth 33 on the key fit into the teeth 21 which are formed upon the lower edges of the guides 17 and into the teeth 30 which are provided upon the bottom face of the locking member 27. Thus, said member, as well as the guide members 17, are securely held against a longitudinal shifting movement upon the chair plate.

In order to hold the key 32 securely in its locking position, I provide a vertically disposed locking pin 36 which is mounted in an opening provided in one of the flanges 13, and is normally depressed by means of a coil spring 37 arranged in said opening and connected to the pin. This spring normally forces the locking pin downwardly and into the opening 34 in the end of the key bar. The upper end of the pin 36 is provided with a horizontally disposed handle 38 and the vertical flange 13 is formed with a beveled or inclined surface 39. When the handle is turned and extended outwardly upon the flange 13, the pin 36 is projected to its locking position by the spring 37. When the handle is turned inwardly, the same rides upwardly upon the beveled surface 39 whereby the pin 36 is lifted against the action of its spring and the key bar is released so that the same may be retracted and removed.

From the foregoing description, taken in connection with the accompanying drawing, the construction of the several parts of my rail fastener, as well as the manner of assembling the same in operative position, will be clearly understood.

In order to protect the locking bar 22 which extends downwardly through the opening 11 in the tie and below the same, I provide the metal shield plate or housing indicated at 40, which is suitably secured to the vertical web 7 of the tie and extends between the top and bottom plates 5 and 6 thereof.

From reference to Fig. 1 of the drawings, it will be observed that the fastening devices are arranged upon the tie plate out of longitudinal alinement with each other so that the rail engaging lugs will engage upon the base flanges of the rail at points spaced from each other longitudinally of the rail. By the provision of such fastening devices, the use of spikes is entirely dispensed with, and means is provided whereby the rails may be securely fastened or clamped upon the metal tie. It is, of course, obvious that in the use of a block signaling system, wherein the rails constitute electrical conductors, suitable insulating pads will be interposed between the chair plates and the upper surface of the tie. By the provision of the vertically, as well as longitudinally adjustable fastening bars, the rails may be elevated by the use of shims to any desired height above the tie surface and securely fastened. It will be seen that a comparatively fine adjustment may be obtained so that the expansion or contraction of the rail may be compensated for by the proper adjustment of the fastening bars, and the rail again securely fastened upon the tie.

My improved rail fastener, as a whole, is comparatively simple in its construction and extremely strong and durable in practical use.

The device may be readily employed upon various metal tie structures, and is not limited to the specific form of tie illustrated in the drawings.

It will also be understood that I contemplate making various structural changes in my improved fastening device and, therefore, reserve the privilege of resorting to all such legitimate changes as may be fairly embodied within the spirit and scope of the invention as claimed.

Having thus fully described my invention, what I desire to claim and secure by Letters Patent is:—

1. In a rail fastener, a rail fastening member mounted for vertical and longitudinal adjustment upon the rail tie, and a longitudinally shiftable locking element, said element and fastening member being provided on their confronting faces with means for locking said member in its adjusted position.

2. The combination with a rail tie, of a vertically movable fastening member mounted upon said tie and provided with a lug for engagement upon a rail base, longitudinally shiftable means mounted on the tie to engage said fastening member and hold the same in its adjusted position, and additional means for locking the longitudinally shiftable means upon the tie.

3. The combination with a rail tie, of a vertically movable fastening member mounted in said tie and provided with means for engagement with the base of a rail, said member also having a series of teeth formed thereon, a longitudinally shiftable member mounted on the tie and provided with teeth to interlock with the teeth on the fastening member, and means for locking the shiftable member against movement.

4. The combination with a rail tie, of a vertically movable fastening member mounted in said tie and provided with means for engagement with the base of a rail, said member being provided with a series of teeth, means removably mounted upon the tie to coöperate with said teeth and lock the fastening member in its adjusted position, and a key slidably mounted upon the tie to coöperate with said fastening member and hold the same against casual movement.

5. The combination with a rail tie, of a vertically and longitudinally adjustable fastening member mounted in the tie and provided with means for engagement with the base of a rail, a movable element mounted upon the tie to coöperate with said fastening member and hold the same in its vertically adjusted position, and additional means to coöperate with said element and hold the same in coöperating relation with the fastening member, said means also locking the fastening member upon the tie against longitudinal shifting movement with respect thereto.

6. The combination with a rail tie, of a vertically and longitudinally adjustable fastening member mounted in said tie and provided with means for engagement upon the base of a rail, an element slidable upon the tie with respect to the fastening member to lock the latter in its vertically adjusted position, a key slidably mounted upon the tie and coöperating with said element to hold the same against sliding movement, and a pin coöperating with said key to hold the same in its applied position.

7. The combination with a rail tie, of longitudinally movable guide members mounted upon said tie, a fastening member mounted for vertical movement between said guide members and provided with means for engagement upon the base of a rail, an element longitudinally slidable between the guides adapted to coöperate with the fastening member and hold the same in its vertically adjusted position, and a single locking key to coöperate with the guide members and said slide and hold the same against movement upon the tie with respect to each other.

8. The combination with a rail tie, of spaced guides longitudinally movable upon the tie, a vertically adjustable fastener carried by the guides and provided with means for engagement with the base flange of a rail, additional means carried by the guides to lock the fastener in its vertically adjusted position, and a removable key mounted upon the tie and coöperating with said guides to hold the same against longitudinal shifting movement.

9. The combination with a rail tie, of spaced guides longitudinally movable upon the tie, a vertically adjustable fastening member carried by the guides and provided with means for engagement upon the base flange of a rail, an element longitudinally slidable between the guides and adapted to coöperate with the fastening member and hold the same in its vertically adjusted position, and a removable locking key to coöperate with said element and with the guides and hold the same against relative longitudinal movement.

10. The combination with a rail tie, of spaced guides longitudinally adjustable upon said tie, a vertically adjustable fastening member carried by the guides and provided with means for engagement upon the base flange of a rail, a locking element mounted upon the guides for longitudinal movement with respect thereto, said locking element and the fastening member having co-engaging means whereby said member is held in its vertically adjusted position, said member and the guides being also provided with teeth on their lower edges, a removable locking key provided with means to coöperate with said teeth and lock the guides and said element against longitudinal movement, and a spring pressed pin to coöperate with the key and hold the same in its applied position.

11. In a rail fastener, a rail fastening member mounted for vertical and longitudinal movement upon the rail supporting tie, a longitudinally shiftable locking element mounted upon the tie to coöperate with said member and lock the same in its adjusted position, and means coöperating with said element to hold the same against longitudinal movement with respect to the rail tie.

12. In a rail fastener, a rail supporting chair, a fastening member mounted upon said chair for vertical and longitudinal movement, a locking element slidably mounted upon the chair to engage the fastening member and hold the same in its adjusted position, and a key slidably mounted upon the chair plate to coöperatively engage said locking element and hold the same against sliding movement.

13. In a rail fastener, a chair plate, a rail fastening member mounted upon the chair plate for vertical and longitudinal movement, a longitudinally shiftable locking element to engage said member and hold the same in its adjusted position, and a key removably mounted upon the chair plate to coöperatively engage the bottom face of said element and hold the same against sliding movement on the chair.

14. In a rail fastener, a chair plate, a vertically and longitudinally movable fastening member mounted upon said chair plate, a locking element longitudinally shiftable upon the chair plate, the confronting faces of the fastening member and said element being provided with interlocking means whereby said member is held in its adjusted position, and means removably mounted upon the chair plate to coöperatively engage said element and hold the same against sliding movement on the chair.

15. In a rail fastener, a rail supporting chair, a vertically and longitudinally adjustable fastening member mounted upon said chair, a longitudinally movable locking element slidably mounted upon the chair, the confronting faces of said element and the fastening member being provided with interlocking means whereby said member is held in its adjusted position, and a transversely slidable locking key mounted upon the chair plate and extending beneath said locking element, said key and the bottom face of said element having co-engaging means whereby the locking element is held against sliding movement on the chair.

In testimony whereof I hereunto affix my signature in the presence of two witnesses.

GEORGE C. AMUNDSON.

Witnesses:
JOHN I. WALKER,
GUSTAV AMUNDSON.

Copies of this patent may be obtained for five cents each, by addressing the "Commissioner of Patents, Washington, D. C."